Dec. 17, 1957 M. F. BAUER 2,816,302
TAP HAVING COMBINED THREAD CUTTING AND SWAGING TEETH
FOLLOWED BY FULL THREAD CUTTING TEETH
Filed Sept. 30, 1953
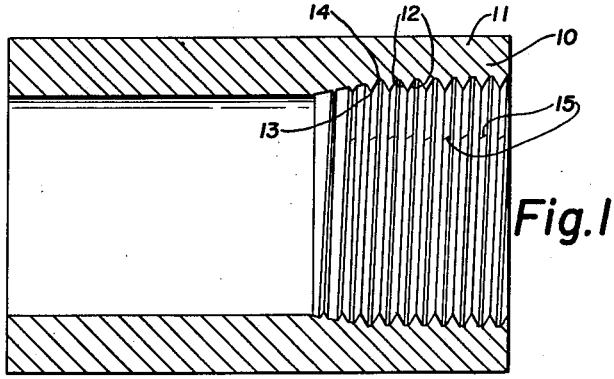
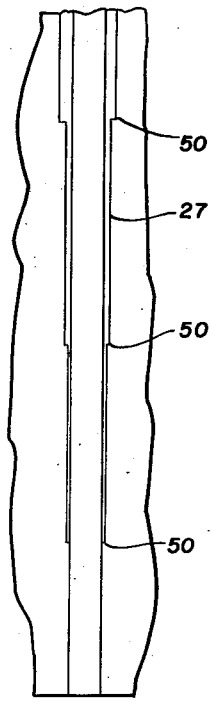
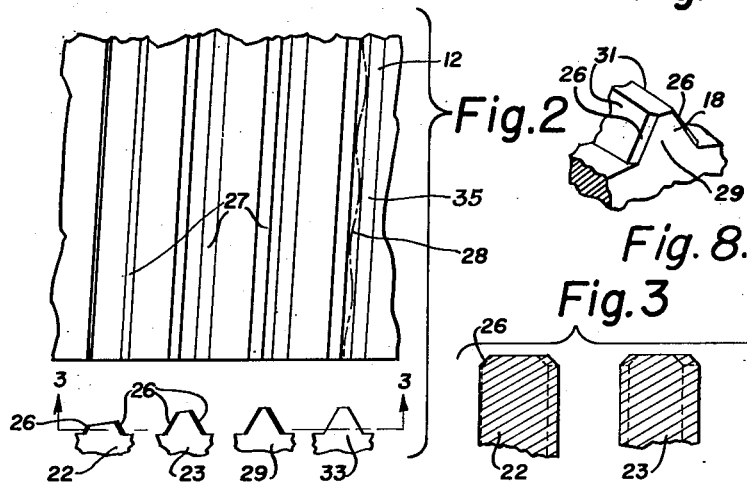
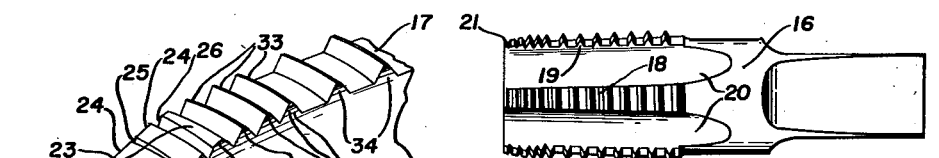
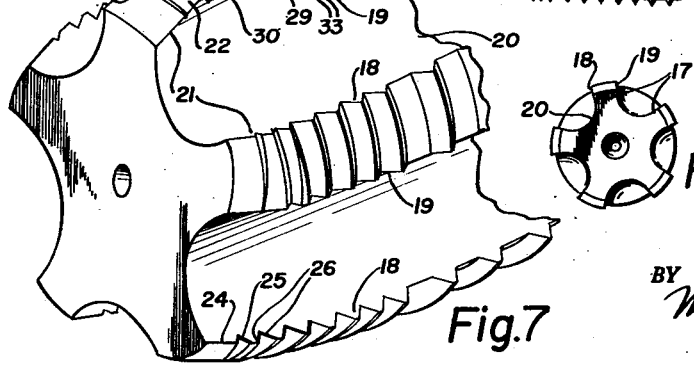
INVENTOR.
MATTHEW F. BAUER

United States Patent Office 2,816,302
Patented Dec. 17, 1957

2,816,302

TAP HAVING COMBINED THREAD CUTTING AND SWAGING TEETH FOLLOWED BY FULL THREAD CUTTING TEETH

Matthew F. Bauer, Cleveland Heights, Ohio

Application September 30, 1953, Serial No. 383,289

3 Claims. (Cl. 10—140)

This invention relates to methods and apparatus for forming threads and more particularly to the formation of tapered female pipe threads. A former practice of cutting these threads with taps, frequently produces threads containing defects, such as waviness and also tool marks where the thread cutting ends. The existence of such defects subjects threaded joints to undesirable spiral leakage when subjected to pressure.

It is therefore an important object of this invention to eliminate such defects whereby a more perfect thread is formed.

Another object of the invention is to provide a new method and tool for forming a partial thread by means of a swedging action followed by full thread cutting in the path made by swedging, or, stated in another way, to employ a tap to cut a helical thread in a bore and to provide means on the tap for causing it to exert a swedging action so correlated with the cutting action as to exert a steadying influence upon the thread cutting action to make the cutting operation easier and to improve the finish of the thread.

Another important object is to provide a method of removing the tool marks left on the flanks of the thread where the cutting of the threads ends.

A still further object is to provide a tapping tool having a construction with which the foregoing objects can be accomplished.

Other objects and a fuller understanding of this invention may be had by referring to the following description and claims, taken in conjunction with the accompanying drawings, in which:

Figure 1 is a longitudinal section through a female dryseal thread illustrating tool marks, notches, or shoulders left on the flanks of the thread by the stopping of the tapping operation in a blind or tapered hole;

Figure 2 is a plan view showing stage formation of a female dryseal groove or helix laid out in the flat diagrammatically to more clearly illustrate the progressive formation or cutting of a thread, with the shapes of the teeth of the tap illustrated directly opposite the shape of groove they cut, and with a sine curve shown in dotted lines along the last complete tooth to illustrate waves frequently inadvertently produced in a female thread;

Figure 3 is a transverse section on a larger scale through the teeth shown in Figure 2, such teeth being the first few lead teeth of a land;

Figure 4 is a schematic plan of a portion of a helix illustrating, by the stepped formation, the progression of cutting the depth of a helix groove to form a female thread;

Figure 5 is a side elevation of the interrupted taper pipe tap employed with this invention;

Figure 6 is an end elevation thereof;

Figure 7 is an enlarged perspective view of one end of this tap showing adjacent lands and the formation of the chamfer teeth and cutting face looking down into a flute of the tap to illustrate the literal dulling of the cutting edges of the chamfer teeth.

Figure 8 is a perspective view of a portion of a tooth 29.

Referring now more particularly to the drawing and to the longitudinal sectional view shown in Figure 1, a tapered female dryseal thread 10 is illustrated as formed in a body 11 such as a pipe fitting. The flanks of the thread are designated by the numerals 12, while the crests are designated by the numerals 13 and the flat roots by the numerals 14. After the usual machine screw tap has been advanced into a tapped hole of the work to cut a female tapered thread in the walls thereof, and the work is reversed in rotation to withdraw the tap, the flanks 12 of the thread are left with tap marks or shoulders 15 where the cutting edge or edges of the tap stops its cutting of the thread. Many times also, the helix of the thread is left with a wavy condition of varying degrees extending axially of or lengthwise on the helix as is well known. These waves and shoulders cause an imperfect thread and are most undesirable, especially in dryseal threads where such imperfections may lead to leakage of the threaded joint; and it is the purpose of this invention to eliminate such wavy conditions and shoulders in thread formation.

The removal of the shoulder or notch imperfections 15 is accomplished after the initial tapered thread formation by a tapping tool, by the process of reversing the direction of rotation of the work as the tap is backed-off, after which the work is again reversed in direction of rotation as the tap is re-entered or re-threaded into the revolving workpiece under slight axial pressure to cause the innermost sides of the full tap thread to shave off the shoulders 15 of the forward flanks and produce uniformly smooth surfaced flanks. The tap is re-entered or threaded into the female thread to a longitudinal extent equal one-half to one thread less than the full initial thread, after which the work is again reversed in direction of rotation and the tap is again backed out of the work. During final withdrawal of the tap the heel sides of the lands of the tap may be forced against the inner flanks of the teeth to exert a slight smoothing or burnishing action thereon.

In order that a tapered pipe thread tap 16, as shown in Figures 5 and 6, can perform the foregoing operation upon the female thread, this tap is provided with the usual lands 17, each having a cutting face 18 and a heel 19 facing on an adjacent flute 20. The cutting face is defined by first and second opposed edges. The forward chamfered end 21 of each land is provided with two or more chamfered partial thread forming or front swedging teeth 22 and 23 plotted on a helix and having cutting edges 24 separated by a helical notch 25. The edges of these notches at the cutting face are beveled or dulled as at 26, at an angle to the radial, as illustrated, to exert a swedging or snow-plow action on the walls of the bore along a helical path. The beveled surfaces, in other words, extend from the opposed edges to respective sides or flanks of the teeth. In other words, the opposite edges of each tooth 22 and 23 are beveled by honing with a stone or tool having an included sixty-degree angle to converge toward the cutting face 18 of the land, as best illustrated at 26 in Figures 2 and 3. The sides or flank of the teeth have been indicated by the reference numeral 31. It is sufficient to so bevel or hone the helical notch 25 which includes a full turn or three hundred sixty degrees, whether such notch includes one, two, three or more of the teeth of the lead or chamfered end 21 of the tap. Thus, as these lead or partial forming teeth start forming or swedging or partial thread groove 27 as shown in Figure 2; their opposed beveled or dulled edges 26 wedge into the metal with a swedging or snow-plow action and have a steadying influence upon the tap axially and radially to preclude such movement thereof as will produce an imperfect thread or a wavy condition lengthwise of the thread as indicated diagrammatically of the dotted line 28 in Figure 2. The third tooth 29 of each land may have its crest slightly or partially chamfered as at 30, and the edges 26 of this tooth may also be honed or beveled, as in the case of the teeth 22 and 23. The succeeding two or three full thread cutting helical teeth 33 of each land, each have a flat crest and a pointed root to cut the full depth of a female thread to provide pointed crests and flat dryseal roots.

The tap may be a standard cut tap without an interrupted thread or it may be of the interrupted thread type with every other succeeding tooth removed, except for the first two or three teeth 33 near the point, which causes the following teeth 34 to be spaced apart to provide for rapid chip clearance. These two or three teeth 33 near the point of the tap will cut a full depth female thread into final shape as shown in Figure 1 and at 35 in Figure 2.

In Figure 4, there is indicated at 50 an exaggerated or stepped illustration of the progression of thread depth forming and cutting by the successive cutting action of the teeth 21, 22, 29, and 33, which, when stopped, produces the tool marks or shoulders 15 in the thread. Conditions which cause waviness in the thread as diagrammatically indicated by the wavy line 28 in Figure 2, and which occur simultaneously with the progression of thread depth cutting, causes varying degrees of notch or shoulder formation. It appears that the greatest degree of tool mark or shoulder formation occurs when there is a coincidence of the maximum amplitude of waves, as indicated at the hills or crests of the wavy line 28, with the progressive steps 50 of thread depth cutting by the successive lands 17 of the tap.

From the description of the tap, it will be observed that as the tap initially and progressively enters the bore of the workpiece, the top cutting edges of the teeth 22 and 23 will cut into the walls of the bore as the beveled or dulled edges 26 of these chamfered partial thread forming teeth swedge their way into the bore walls along a helical path to preliminarily form the partial thread 27 and thus, in effect, wedge themselves in the walls of the work to cooperate with the action of the three full depth thread cutting teeth 33, which follow in the wake or helical path thereof to hold the full thread cutting teeth 33 against accidental longitudinal, radial, and vibrational movement. This swedging, wedging, and snow-plow action of the teeth 22 and 23 continues throughout the entire thread cutting operation by the teeth 33, and besides causing the cutting of a better thread without waviness, has the effect of heating and swedging the bore walls along the helical path in preparation of the actual subsequent thread cutting by the teeth 33 to thereby make cutting of the thread easier.

After the tap has finished cutting a female thread in a blind or tapered hole in a pipe member or workpiece in the manner above described, the work is reversed in its direction of rotation as the tap is backed-off or unthreaded therefrom. This backing-off operation provides for relative longitudinal movement between the tapered tapped female thread and the thread of the tap, in order that the first few teeth 22, 23, and 29 are freed of their wedging and snow-plowing action and the remaining teeth 29, 33, and 34 are freed from their snug fit or mating with the female thread. The tap may be backed-off to the requisite extent to accomplish the above, or withdrawn entirely from the threaded bore. Then, as previously stated, the work is again reversed in direction of rotation and the tap is progressively re-entered or re-threaded partially into the initially formed thread under axial thrust or pressure. Because at this stage there is the freedom of longitudinal movement of the tap relative to the female thread, the cutting edges of the teeth 33, which are entered farthest into the bore, will progressively exercise a shaving action upon the tool marks or shoulders 15 in the outer flanks of the thread. As the tap travels farther and farther into the thread, the teeth 33 will progressively remove the tool marks 15 and produce perfectly smooth thread flanks. The initial tapping of the thread and the re-entry of the tap into the thread to remove the tool marks 15 may be performed on automatic or semi-automatic machines or may be performed by hand. When a machine is employed having an automatic feed with a hand wheel for adjusting the tap relative to the work, and the tap is being automatically re-entered into the initial thread, an operator's hand placed on the hand wheel will feel slight vibrations caused by the cutting edges of the teeth 33 engaging and removing the tool marks or shoulders 15.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tool for forming threads comprising, a taper tap having a plurality of front chamfered teeth and full thread cutting teeth extending along a helical path around the axis of the tool and disposed in lands formed between axially extending flutes in said tool, said full thread cutting teeth constructed to follow said chamfered teeth and move in said helical path made by the latter, said chamfered teeth being of successively increasing height toward said full thread cutting teeth, each said chamfered tooth including a front face surface having first and second opposed edges, first and second side surfaces extending generally normal to said front face surface, a first beveled surface extending between said first opposed edge of said front face surface and said first side surface to define a first dull corner, a second beveled surface extending between said second opposed edge of said front face surface and said second side surface to define a second dull corner, each said full thread cutting tooth including a front face surface having first and second opposed edges, first and second side surfaces extending generally normal to said front face surface, said first opposed edge of said front face surface meeting said first side surface to define a first sharp corner, and said second opposed edge of said front face surface meeting said second side surface to define a second sharp corner.

2. A tool for forming threads comprising, a tap having a plurality of front swedging teeth and thread cutting teeth extending along a path around the axis of the tool and disposed in lands formed between axially extending flutes in said tool, said thread cutting teeth constructed to follow said swedging teeth and move in said path made by the latter, each said swedging tooth including a front face surface having first and second opposed edges, first and second side surfaces extending generally normal to said front face surface, a first beveled surface extending between said first opposed edge of said front face surface and said first side surface to define a first dull corner, a second beveled surface extending between said second opposed edge of said front face surface and said second side surface to define a second dull corner, each said thread cutting tooth including a front face surface having first and second opposed edges, first and second side surfaces extending generally normal to said front face surface, said first opposed edge of said front face surface meeting said first side surface to define a first sharp corner, and said second opposed edge of said front face surface meeting said second side surface to define a second sharp corner.

3. A tool for forming threads comprising, a tap having a plurality of front swedging teeth and thread cutting teeth extending along a path around the axis of the tool and disposed in lands formed between axially extending flutes in said tool, said thread cutting teeth constructed to follow said swedging teeth and move in said path made by the latter, each said swedging tooth including a front face surface having first and second opposed edges, first and second side surfaces extending generally normal to said front face surface, a first beveled surface extending between said first opposed edge of said front face surface and said first side surface to define a first dull corner, a second beveled surface extending between said second opposed edge of said front face surface and said second side surface to define a second dull corner, said first and second beveled surfaces extending a distance less than said first and second side surfaces respectively, the cross sectional area of each said swedging teeth between said side surfaces thereof being larger than the area of said front face of each said swedging teeth respectively, each said thread cutting tooth including a front face surface having first and second opposed edges, first and second side surfaces extending generally normal to said front face surface, said first opposed edge of said front face surface meeting said first side surface to define a first sharp corner, and said second opposed edge of said front face surface meeting said second side surface to define a second sharp corner.

References Cited in the file of this patent

UNITED STATES PATENTS

| | | |
|---|---|---|
| 1,252,525 | Woodward | Jan. 8, 1918 |
| 1,912,517 | De Lapotterie | June 6, 1933 |
| 2,159,308 | Anthony | May 23, 1939 |
| 2,189,152 | Procunier | Feb. 6, 1940 |
| 2,319,544 | Harley | May 18, 1943 |
| 2,556,174 | Evans | June 12, 1951 |
| 2,703,419 | Barth | Mar. 8, 1955 |

FOREIGN PATENTS

| | | |
|---|---|---|
| 350,773 | Germany | Jan. 18, 1921 |